United States Patent [19]
Ueda et al.

[11] Patent Number: 6,027,809
[45] Date of Patent: Feb. 22, 2000

[54] SEALING MATERIAL MADE OF EXPANDED GRAPHITE AND A METHOD OF PRODUCING THE SAME

[75] Inventors: Takahisa Ueda; Daisaburo Horii; Katsunori Sugita, all of Sanda, Japan

[73] Assignee: Nippon Pillar Packing Co., Ltd., Osaka, Japan

[21] Appl. No.: 09/011,203

[22] PCT Filed: Jun. 26, 1997

[86] PCT No.: PCT/JP97/02259

§ 371 Date: Feb. 18, 1998

§ 102(e) Date: Feb. 18, 1998

[87] PCT Pub. No.: WO98/01389

PCT Pub. Date: Jan. 15, 1998

[30] Foreign Application Priority Data

Jul. 5, 1996 [JP] Japan .................................. 8-176580
Jul. 5, 1996 [JP] Japan .................................. 8-176581

[51] Int. Cl.[7] .................................. B32B 9/00; F16J 15/10
[52] U.S. Cl. .................................. 428/408; 428/409; 428/213; 428/218; 277/539; 264/123
[58] Field of Search .................................. 428/409, 213, 428/218, 402, 408; 277/539, 650; 106/33; 423/448; 264/123, 125

[56] References Cited

U.S. PATENT DOCUMENTS 4,216,266   8/1980  Hirschvogel et al. .
4,269,391   5/1981  Saito et al. .
5,228,701   7/1993  Greinke et al. .
5,452,904   9/1995  Huber et al. .
5,462,781  10/1995  Zukowski .
5,628,520   5/1997  Ueda et al. .

FOREIGN PATENT DOCUMENTS 7-118627   5/1995  Japan .
7-165470   6/1995  Japan .

*Primary Examiner*—Deborah Jones
*Assistant Examiner*—Jason Savage
*Attorney, Agent, or Firm*—Jones, Tullar & Cooper, P.C.

[57] ABSTRACT

The present invention relates to a sealing material made of expanded graphite and to a method of producing it. In the sealing material made of expanded graphite of the present invention, a surface layer portion of an expanded graphite base material in which expanded graphite particles are pressurized is subjected to a blast process or the like, whereby the weight of the expanded graphite base material is reduced by a range of 0.5 to 3%, so that the diffraction peak of an X-ray diffraction of the exposed surface layer portion of the expanded graphite base material is in a range of 26.52° to 26.48°. In such a sealing material made of expanded graphite, the elongation rate and the tensile strength are improved, and also flexibility is remarkably improved. As a result, the product application range is extended and product productivity are improved. The sealing material may be preferably used in various kinds of sealing members for high-temperature use such as a packing, a gasket, a V-shaped ring, and a valve seat, and a sliding material such as a bearing, or a heat insulating material for a high temperature vacuum furnace.

24 Claims, 8 Drawing Sheets

FIG. 13
(PRIOR ART)
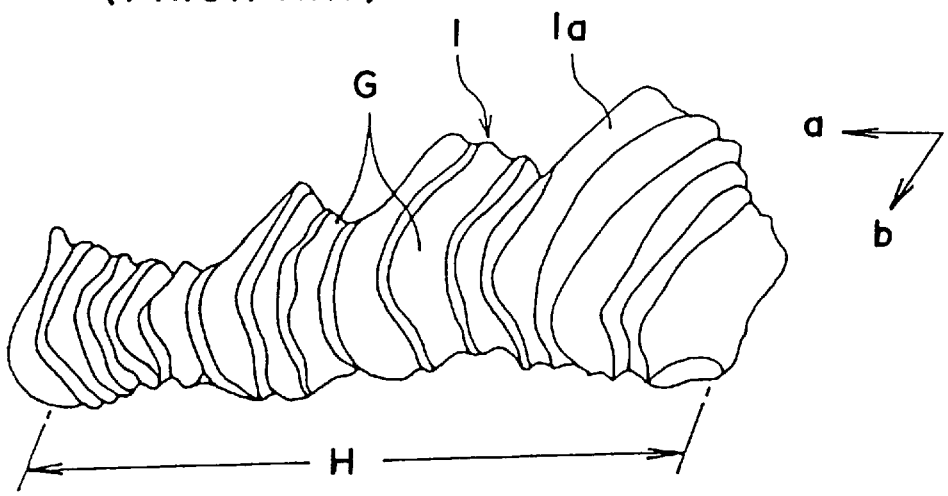
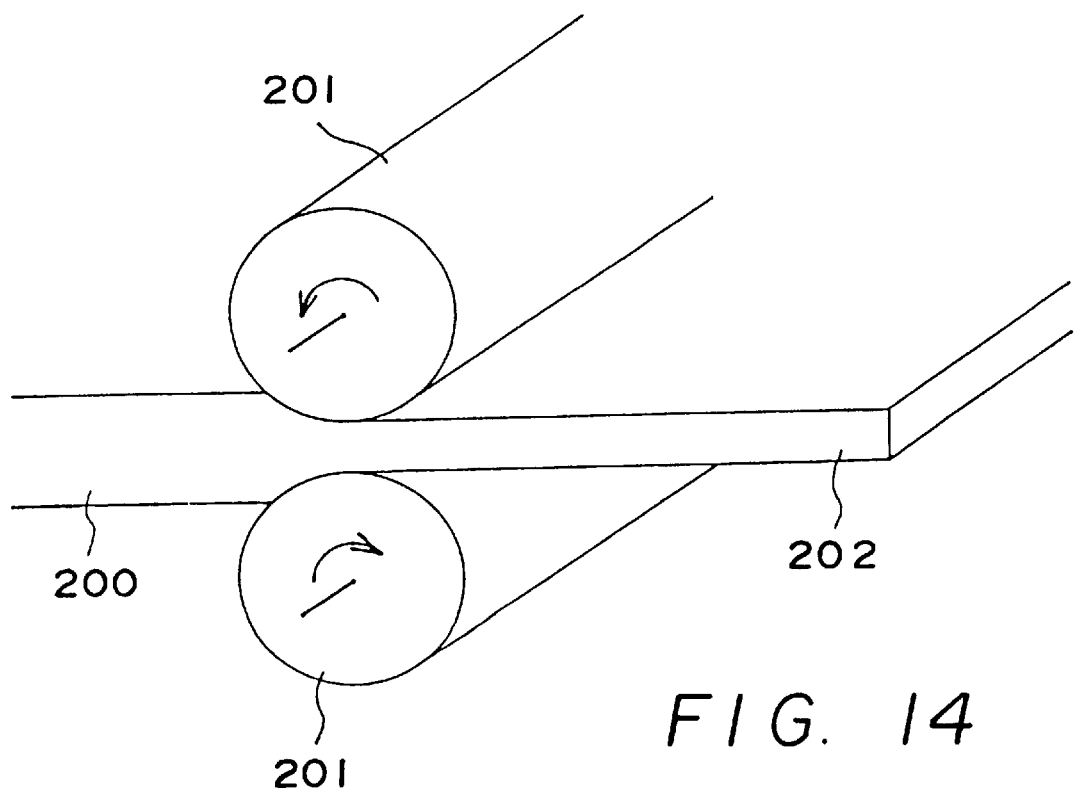
FIG. 14

SEALING MATERIAL MADE OF EXPANDED GRAPHITE AND A METHOD OF PRODUCING THE SAME

TECHNICAL FIELD

The present invention relates to a sealing material made of expanded graphite which is used in, for example, various kinds of sealing members for high-temperature use such as a packing, a gasket, a V-shaped ring, and a valve seat, and a sliding material such as a bearing, or a heat insulating material for a high temperature vacuum furnace, and also to a method of producing the sealing material.

BACKGROUND ART

Generally, various types of sealing members are configured by rubber or a polytetrafluoroethylene resin (Teflon). In recent years, sealing members made of expanded graphite which is superior in terms of heat resistance and the like have widely been developed.

As shown in FIG. 12, such expanded graphite consists of a bellow-like structure 1 having a thickness H (about 5 to 10 mm) in which acid-treated graphite 1A having a thickness of HO and a laminate structure of graphite crystals 1a is subjected to a heat expansion process and as a result laminations are opened in the laminate direction (the direction indicated by arrow a) so that a gap G is formed between the graphite particles la as shown in FIG. 13.

A sheet-like sealing material made of expanded graphite such as a gasket sheet is produced by using such expanded graphite having the above-mentioned bellow-like structure, in the following manner. As shown in FIG. 14, an expanded graphite mat-like member 200 which is expanded by heating so as to have a thick mat-like shape and in which both the surface and inner layer portions have a uniform composition is supplied to a pair of upper and lower pressure rolls 201, 201 via a belt conveyor which is not shown, and passed therethrough, whereby the expanded graphite crystals 1a are pressurized to be integrated with each other so as to produce a sheet-like sealing material made of expanded graphite 202. During the production, the bellow-like expanded graphite 1 (see FIG. 13) which is at a low density and exists in the surface layer portion (this means both the front and back layer portions of the mat-like member 200, and hereinafter such portions are referred to as merely the surface layer portion) of the mat-like member 200 suffers strong compression and shearing forces when it passes through the pair of pressure rolls 201, 201. As shown in FIG. 15, therefore, the shape of the expanded graphite is changed into a thin-leaf compressed member 203 which has a large area and a small thickness of t1. By contrast, the bellow-like expanded graphite 1 existing in the inner layer portion of the mat-like member 200 suffers compression and shearing forces which are smaller in degree than those applied to the graphite of the surface layer portion, when it passes through the pair of pressure rolls 201, 201. As shown in FIG. 16, therefore, the shape of the expanded graphite is changed into a compressed member 204 which has a smaller area and a larger thickness of t2 as compared with the thin-leaf compressed member 203 of the surface layer portion.

FIG. 17 is a perspective view showing a part of the sheet-like sealing material made of expanded graphite 202 of the prior art which is produced as described above, in cutting away in a step-like manner. In the surface layer portion, the thin-leaf compressed members 203 such as shown in FIG. 15 are in a regular and high orientation state with high density so that the longitudinal direction of each member is perpendicular to that of the sheet. On the other hand, in the inner layer portion, the thicker compressed members 204 such as shown in FIG. 16 are arranged irregularly or randomly.

In the thus configured sealing material made of expanded graphite of the prior art, the mechanical strength is originally low and the base material is formed only by pressurizing expanded graphite, and the thin-leaf compressed members 203 are highly oriented with high density. When a tensile force is applied, therefore, the sealing material exhibits behaviors such as (1) cracks formed in the thin-leaf compressed members 203 of the surface layer portion grow, and (2) the surface layer portion in a high orientation state and with high density forms cracks when a small bending stress is applied. The cracks rapidly propagate to the inner layer portion, and the sealing material is finally broken. In this way, such a sealing material has an elongation of substantially zero and a very small tensile strength. When the sealing material made of expanded graphite is handled or various kinds of sealing members are worked, therefore, the materials must be carefully treated so that a bending or tensile force is not accidentally applied. Consequently, there results not only a problem in that products such as a sealing member using the sealing material made of expanded graphite have a narrow application range, but also a problem in that working means are naturally restricted and product productivity is low.

Furthermore, the sealing material made of expanded graphite of the prior art is so poor in flexibility that it is easily broken by only applying a small number of repetitive bending operations. Moreover, in the surface layer portion, the thin-leaf compressed members 203 are in a regular and high orientation state with high density. When the sealing material is bent with a small radius of curvature, therefore, phenomena which reduce the sealing properties, such as cracks or partial flaking easily occur in the thin-leaf compressed members 203 of the surface layer portion. A working process involving a bending operation such as winding or folding is difficult to do. Therefore, there results not only a problem in that products such as a sealing member using the sealing material made of expanded graphite have a narrow application range, but also a problem in that working means are restricted and improvement of product productivity is naturally limited.

SUMMARY OF THE INVENTION

The present invention has been developed in view of the above-described circumstances. It is an object of the present invention to provide an elongation, improve flexibility, and enhance tensile strength by simple means, so that the product application range is widened.

It is another object of the present invention to improve flexibility, and attain an improvement in product productivity.

In order to attain these objects, in the sealing material made of expanded graphite of the present invention, a surface layer portion of an expanded graphite base material in which expanded graphite particles are pressurized to be integrated with each other (preferably, in both front and back surface layer portions and the whole of the portions) is subjected to a removal process so that the weight of the expanded graphite base material is reduced by a range of 0.5 to 3%.

According to the present invention, the surface layer portion in which thin-leaf compressed members in a high orientation state and with high density as a result of pressurization and which is hardly expected to elongate is subjected to a removal process. Consequently, the elongation of and the tensile strength of the sealing material can be enhanced by utilizing the elongation characteristics and the tensile strength of the inner layer portion in which compressed members of a relatively large thickness are randomly oriented. As a result, the application range of a product using the sealing material can be expanded, the restriction on working means can be reduced, and also product productivity can be improved.

In the sealing material made of expanded graphite of the present invention, preferably, a diffraction peak (2 θ angle) of an X-ray diffraction of an exposed surface of the expanded graphite base material is in a range of 26.52° to 26.48°. In summary, the surface layer portion of the expanded graphite base material is formed so as to be in the range of a diffraction peak.

In the other sealing material made of expanded graphite of the present invention, the surface layer portion (preferably, in both front and back surface layer portions and the whole of the portions) of an expanded graphite base material in which expanded graphite particles are pressurized to be integrated with each other is set so that a diffraction peak of an X-ray diffraction of an exposed surface is in a range of 26.53° to 26.45°.

According to this configuration, flexibility can be improved so that the allowable number of bending operations is increased. Furthermore, the whole or most of the thin-leaf compressed members which are highly oriented in the surface layer portion and which have a large area and a small thickness are removed. Therefore, cracks or partial flaking in the surface layer portion are prevented from occurring in a working process involving a bending operation such as winding or folding, and even a product of a small radius of curvature can be produced as a product having an excellent sealing property. In other words, the application range of a product using the sealing material can be expanded, the restriction on working means can be reduced, and also product productivity can be improved.

When the surface layer portion of the expanded graphite base material is removed by 10% or less, preferably, 1 to 6% of a thickness of the material, the diffraction peak can be easily set and the material is not wasted in a large amount.

As the form of the sealing material made of expanded graphite, any one of a sheet, a press-molded product, or a string can be adopted. In the case of a sheet, when it is cut into a suitable size, it can cope with various uses. In the case of a press-molded product, a ring-shaped packing or bearing can easily be produced. In the case of a string, the size adjustment in the case where it is actually mounted as a packing or the like can easily be performed.

The method of producing a sealing material made of expanded graphite of the present invention is characterized in that expanded graphite particles are pressurized to be integrated with each other to form an expanded graphite base material, and a whole of a surface layer portion (preferably, both front and back surface layer portions) of the base material is then subjected to a removal process so that the weight of the expanded graphite base material is reduced by a range of 0.5 to 3%, by at least one of working means including a micro blasting process, a laser process, and a sputtering process.

According to this production method, the process of removing the surface layer portion can be efficiently performed and the removal amount can be arbitrarily adjusted.

In the production method, when a micro blasting process is used as the removal processing means for the surface layer portion of the expanded graphite base material, walnut powder of a particle diameter of 50 to 100 μm may be used as particles for blasting. In this case, even when a part of the particles remains on the removal surface in the blasting process, there is no fear that the counter stem and the like are damaged depending upon the use manner because the particles are soft walnut particles.

The other production method of the present invention is characterized in that expanded graphite particles are pressurized to be integrated with each other to form an expanded graphite base material, and a whole of a surface layer portion (preferably, both front and back surface layer portions) of the base material is then subjected to a removal process so that a diffraction peak of an X-ray diffraction of an exposed surface is in a range of 26.53° to 26.45°, by at least one of working means including a micro blasting process, a laser process, and a sputtering process. According to this production method, the process of removing the surface layer portion can be efficiently performed and the removal amount can be finely adjusted. Therefore, quality can be improved.

In the production method, when a micro blasting process is used as the removal processing means for the surface layer portion of the expanded graphite base material, walnut powder of a particle diameter of 50 to 100 μm may be used as particles for blasting. In this case, even when a part of the particles remains on the surface after removal in the blasting process, there is no fear that the counter stem and the like are damaged depending upon the use manner because the particles are soft walnut particles.

The removal processing means for the surface layer portion is not restricted to a micro blasting process. When the blasting process is employed, it is preferable to satisfy the following conditions.

Expanded graphite is commercially produced, and has a dimension of 1 mm or less in a width direction (the direction indicated by arrow b in FIG. 13). From this point of view, particles of a particle diameter of 1 mm or less are preferably used as the particles used in the blasting process. It is most preferable to use walnut powder of a particle diameter of 50 to 100 μm as particles for the blasting process. Alternatively, SiC powder, glass beads, iron powder, or plastic beads may be used.

BRIEF DESCRIPTION OF DRAWINGS

FIG. 13 is an enlarged perspective view showing expanded graphite particles.

FIG. 14 is a perspective view schematically showing the main portions of means for producing a sheet-like sealing material made of expanded graphite.

DESCRIPTION OF THE PREFERRED EMBODIMENTS

Hereinafter, embodiments of the present invention will be described with reference to the drawings.

Figure 1:
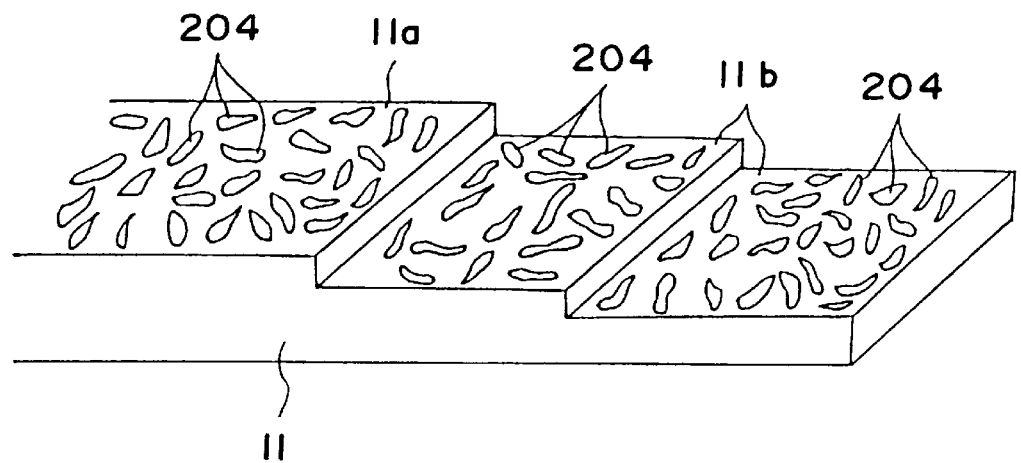
FIG. 1 is a perspective view showing a part of the sheet-like sealing material made of expanded graphite of the present invention, in cutting away in a step-like manner.
Figure 12:
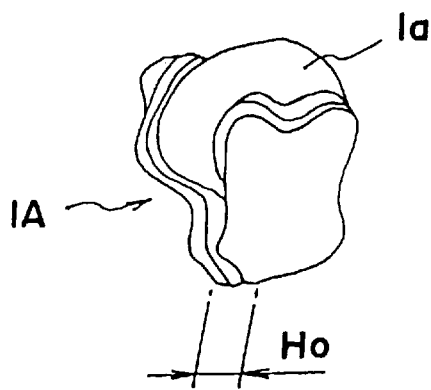
FIG. 12 is an enlarged perspective view showing a state of acid-treated graphite particles before expansion.
Figure 15:
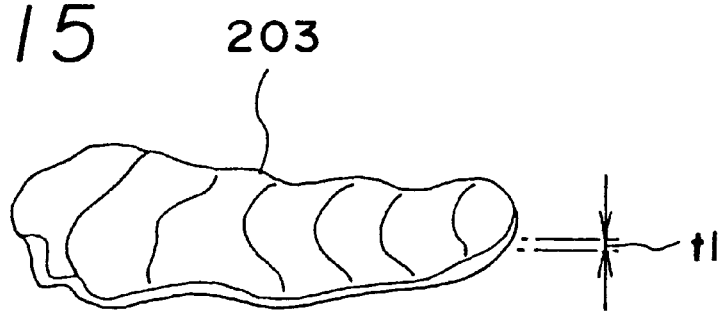
FIG. 15 is an enlarged perspective view showing thin-leaf compressed members in the surface layer portion the form of which is changed during production.

FIG. 1 is a perspective view showing a part of the sheet-like sealing material made of expanded graphite of the invention, in cutting away in a step-like manner. In FIG. 1, 11 designates an expanded graphite base material. In the base material 11, expanded graphite particles 1a (FIG. 12) are pressurized to be integrated with each other, by subjecting graphite 1A which is acid-treated, as shown in FIG. 12, to an expansion process as shown in FIG. 13, and then supplying an expanded graphite mat-like member 200 which is expanded so as to have a thick mat-like shape, to a pair of pressure rolls 201, 201 via a belt conveyor (not shown) and passing the member therethrough as shown in FIG. 14.

Figure 16:
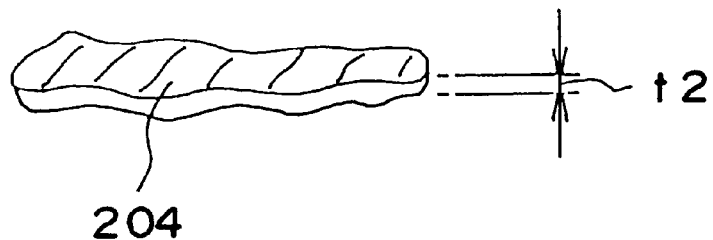
FIG. 16 is an enlarged perspective view showing compressed members in the inner layer portion the form of which is changed during production.
Figure 17:
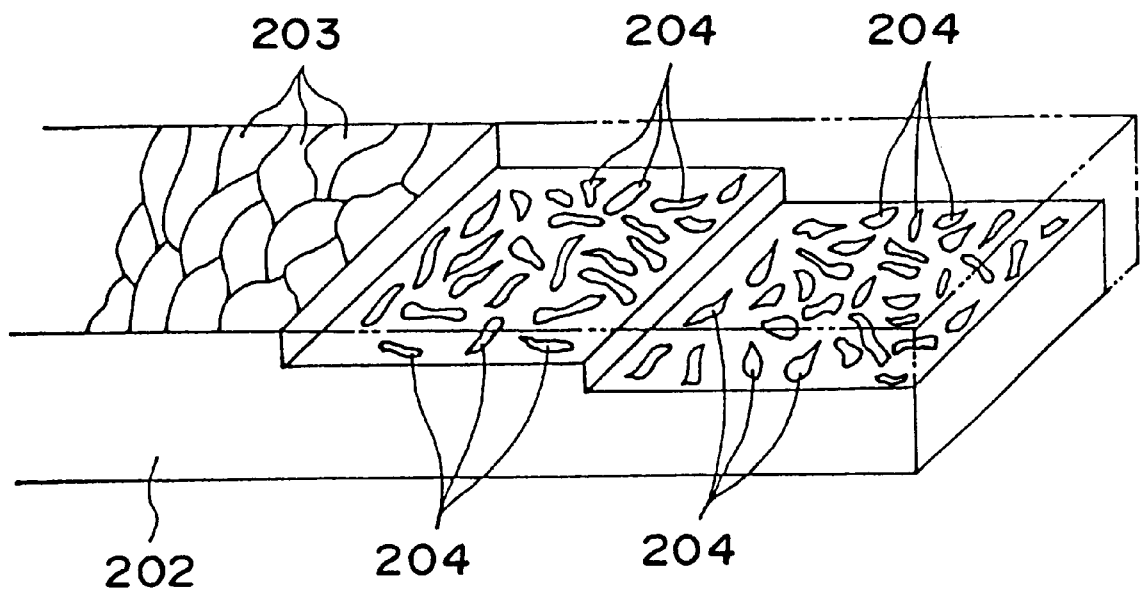
FIG. 17 is a perspective view, cut away in a step-like manner showing a part of a sheet-like sealing material made of expanded graphite according to the prior art.

The whole area of the front and rear surface layer portions of the sheet-like expanded graphite base material 11 is subjected to a removal process by applying a micro blasting process using, for example, walnut powder of a particle diameter of 50 to 100 μm as particles for blasting, so that the weight of the expanded graphite base material 11 is reduced by a range of 0.5 to 3%, thereby setting a diffraction peak of an X-ray diffraction of the surface layer portion of the expanded graphite base material 11 which is exposed as a result of the removal process to be in a range of 26.52° to 26.48°. As a result, a configuration in which compressed members 204 of a substantially same size and a large thickness such as those shown in FIG. 16 are randomly arranged in both the surface layer portion 11a and the inner layer portion 11b.

In the thus configured sheet-like sealing material made of expanded graphite, the compressed members 204 of a large thickness are randomly oriented in both the surface and inner layer portions of the expanded graphite base material 11. Even when a tensile force of some degree is applied to the sealing material, therefore, a rupture caused by rapid propagation of a crack from the surface layer portion to the inner layer portion does not occur, and the elongation rate and tensile strength of the sealing material can be enhanced.

Figure 2:
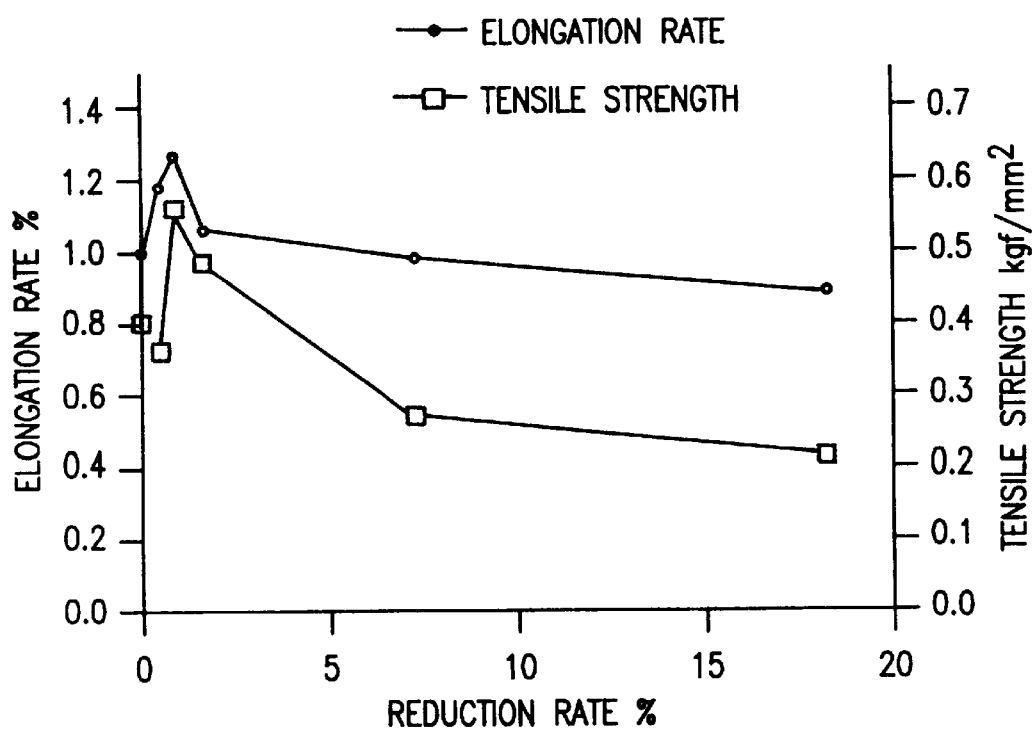
FIG. 2 is a graph showing relationships relative to the reduction rate due to a blasting process on the surface layer portion of a sheet-like expanded graphite base material, and the elongation rate and tensile strength.
Figure 3A:
In FIG. 3, (a) to FIG. 3 (f) are characteristic diagrams showing correlations between the elongation amount and the tensile strength in samples used in tests.
Figure 3B:
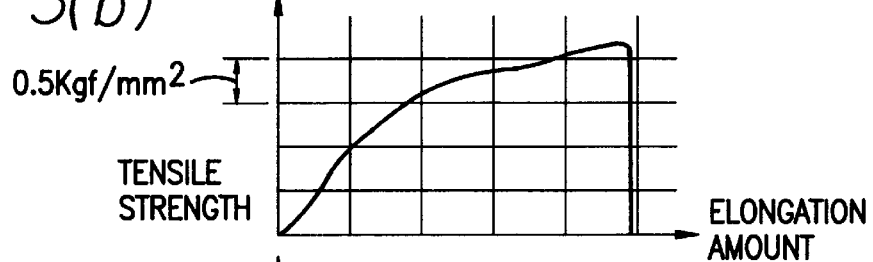
Figure 3C:
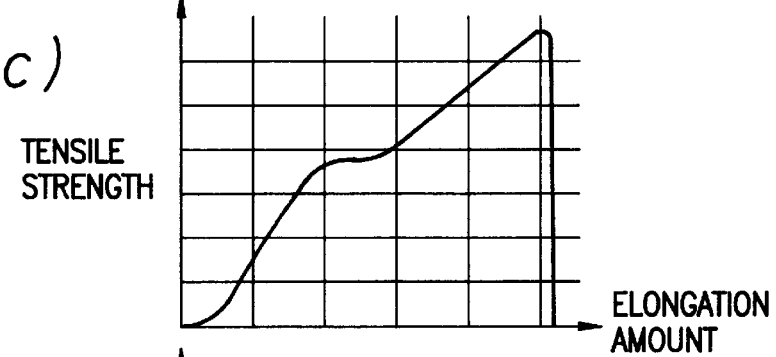
Figure 3D:
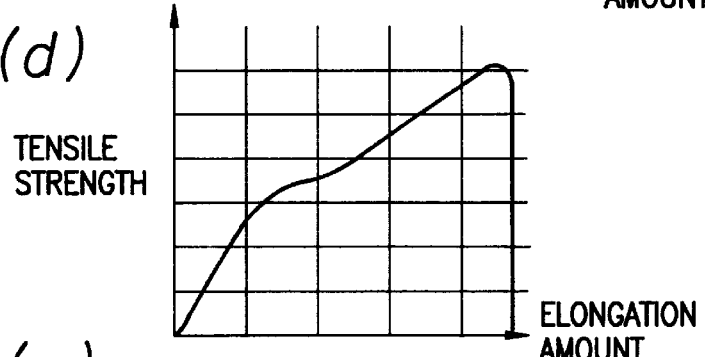
Figure 3E:
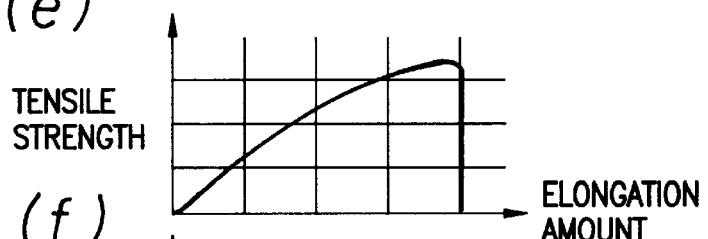
Figure 3F:
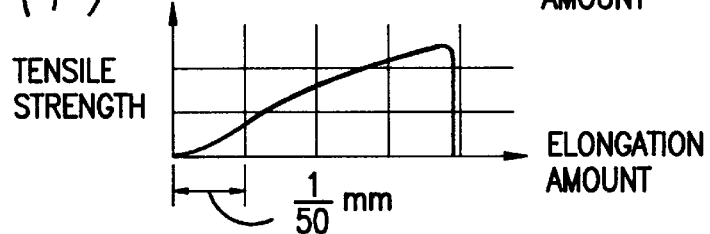

FIG. 2 and Table 1 show the results of tests which were conducted on relationships between the reduction rate (%) due to a blasting process on the front and rear surface layer portions of the sheet-like expanded graphite base material 11, and the elongation rate (%), and relationships of the tensile strength (kgf/mm$^2$) in the case where samples are pulled at a rate of 10 mm/min when the distance between chucks is 80 mm. FIG. 3, (a) to FIG 3 (f) are characteristic diagrams showing the correlations between the elongation amount (mm) and the tensile strength in samples a to f listed in Table 1.

TABLE 1

| Reduction rate (%) | Elongation rate (%) | Tensile strength (kgf/mm$^2$) | Sample |
|---|---|---|---|
| 0 | 0.99 | 0.39 | a |
| 0.5 | 1.17 | 0.36 | b |
| 0.9 | 1.25 | 0.56 | c |
| 1.6 | 1.06 | 0.48 | d |
| 7.2 | 0.99 | 0.27 | e |
| 18.1 | 0.90 | 0.22 | f |

As is apparent from the test results of FIG. 2 and Table 1, all the products with a reduction rate in the range of 0.5 to 3% have an increased elongation rate as compared with those with a reduction rate smaller than 0.5% and larger than 3%, and a tensile strength which is substantially equivalent or superior to that of products of the reduction rate smaller than 0.5% and which is very much larger than that of products with a reduction rate larger than 3%. Particularly, it will be seen that the products with a reduction rate in the range of 0.8 to 1.0% are excellent in both elongation rate and tensile strength.

When the characteristic diagrams shown in (a) to (f) of FIG. 3 are studied, the following will be seen. In sample a with a reduction rate of 0%, when a tensile force is applied, first, the tensile force acts on the inner layer portion in which the compressed members 204 of a larger thickness are arranged irregularly or randomly, and the strength and the elongation amount are increased to saturation. Next, the tensile force acts on the surface layer portion in which thin-leaf compressed members 203 having a large area and a small thickness are in a regular and high orientation state with high density along a direction perpendicular to the longitudinal direction of the sheet. The thin-leaf compressed members 203 constituting the surface layer portion easily crack. Once a crack is formed, it rapidly grows propagates into the inner layer portion. Therefore, a further increase in strength and the elongation amount is hardly expected after they reach saturation. In sample e with a reduction rate of 7.2% and sample f with a reduction rate of 18.1%, a surface layer portion consisting of the thin-leaf compressed members 203 does not exist, and hence both the strength and elongation amount do not exceed those of the inner layer portion of sample a.

By contrast, in the products corresponding to the present invention, i.e., sample b with a reduction rate of 0.5%, sample c with a reduction rate of 0.9%, and sample d with a reduction rate of 1.6%, most of the thin-leaf compressed members 203 are removed away from both the inner layer portion 11b and the surface layer portion 11a, or the whole of the thin-leaf compressed members 203 is removed away, thereby forming a configuration in which the compressed members 204 of substantially the same size and a large thickness are randomly arranged. Therefore, it will be seen that the configuration exhibits the characteristics that the strength and elongation amount are increased by a counteraction of the inner layer portion 11b against the tensile force, and further increased by a counteraction of the surface layer portion 11a having a composition which is substantially identical with that of the inner layer portion, against the tensile force, with the result that the elongation rate and tensile strength of the whole of the sealing material are enhanced as described above.

Next, products in which the whole area of the front and back surface layer portions of the above-mentioned expanded graphite base material 11 shown in FIG. 1 is subjected to a removal process by applying a micro blasting process using walnut powder of a particle diameter of 50 to 100 μm as particles for blasting, so that the material removed over the whole area of the surface layer portions is less than 10%, preferably, 1 to 6% of the thickness of the expanded graphite base material 11 and the diffraction peak (2 θ angle) of an X-ray diffraction of the exposed surfaces 11a, 11b is in a range of 26.53° to 26.45°, thereby making the composition of the surface layer portions substantially identical with that of the inner layer portion the following can be attained. Since both the surface and inner layer portions of the expanded graphite base material 11 have a substantially uniform composition in which the compressed members 204 of a larger thickness (see FIG. 16) are randomly oriented, flexibility is improved, and rupture does not occur even when the products undergo repetitive bending operations. Furthermore, cracks and partial flaking do not occur in the surface layer portion in a working process involving a bending operation, and even a product of a small radius of curvature can be produced as a product having excellent strength and sealing property.

Various kinds of tests were conducted on sheet-like sealing materials made of expanded graphite which are configured as described above, and prior art products in which the whole of the surface layer portion is not removed away, and the results of the test will be described.

(1) FLEXIBILITY TEST

Figure 4:
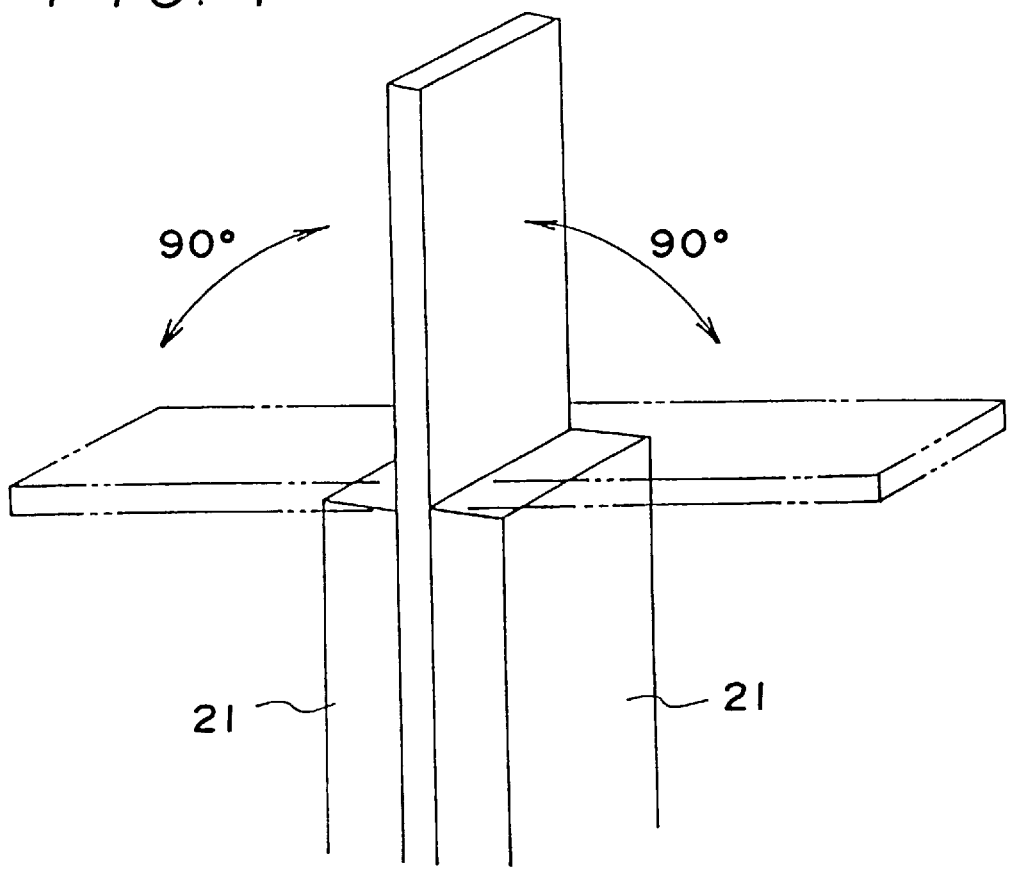
FIG. 4 is a perspective view illustrating the state of a flexibility test.

Test pieces corresponding to the present invention were obtained by applying a blasting process to the whole area of the front and back surface layer portions of the sheet-like expanded graphite base material 11 of a thickness of 0.38 mm and density of 1.0 g/cm$^3$ to remove the surface layer portion of the expanded graphite base material 11 by 5% of the thickness (at this time, the diffraction peak of an X-ray diffraction is 26.48°), and cutting the resulting sheet-like sealing material made of expanded graphite into tape-like pieces of a width of 20 mm and a length of 100 mm. Test pieces corresponding to prior art products were obtained by cutting a sheet-like sealing material made of expanded graphite in which the front and back surface layer portions of a sheet-like expanded graphite base material of the same thickness and density as those described above are not removed away, into tape-like pieces of the same width and length as those described above. Each of these test pieces was fixedly clamped by a pair of fixing jigs 21, 21 as shown in FIG. 4, and then bent by 90° repeatedly and right and left alternatively. The number of bending operations at which the piece was broken was measured three times (X1, X2, X3). Table 2 shows the results of the tests.

TABLE 2

| | Allowable number of bending operations (times) | | |
|---|---|---|---|
| Test piece | X1 | X2 | X3 |
| Invention | 1951 | more than 2000 | more than 2000 |
| Prior art | 2 | 3 | 6 |

Figure 5:
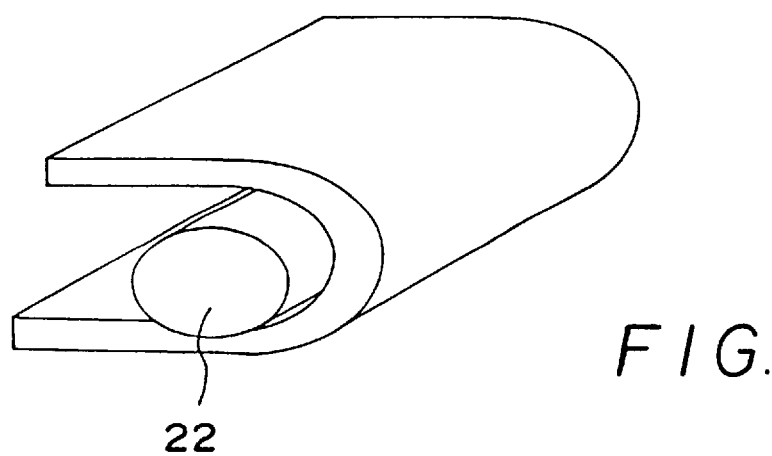
FIG. 5 is a perspective view illustrating the state of a winding test.

Test pieces corresponding to the invention were obtained by applying a blasting process to the whole area of the front and back surface layer portions of the sheet-like expanded graphite base material 11 of a thickness of 0.2 mm and a density of 1.0 g/cm$^3$ to remove the surface layer portion of the expanded graphite base material 11 by 2% of the thickness (at this time, the diffraction peak of an X-ray diffraction is 26.48°), and cutting the resulting sheet-like sealing material made of expanded graphite into tape-like pieces of a suitable width. Test pieces corresponding to prior art products were obtained by cutting a sheet-like sealing material made of expanded graphite in which the front and back surface layer portions of a sheet-like expanded graphite base material of the same thickness and density as those described above are not removed away, into tape-like pieces of the same width and length as those described above. These test pieces were wound on round bars 22 of various radii by 180° as shown in FIG. 5. In this testing, the radius at which cracks and partial flaking do not occur in the outer surface, i.e., the windable radius (mm) was measured three times (X1, X2, X3). Table 3 shows the results of the tests.

TABLE 3

| | Windable radius (mm) | | |
|---|---|---|---|
| Test piece | X1 | X2 | X3 |
| Invention | 1 | 1.5 | 2.0 |
| Prior art | 4.5 | 5 | 6 |

Figure 6:
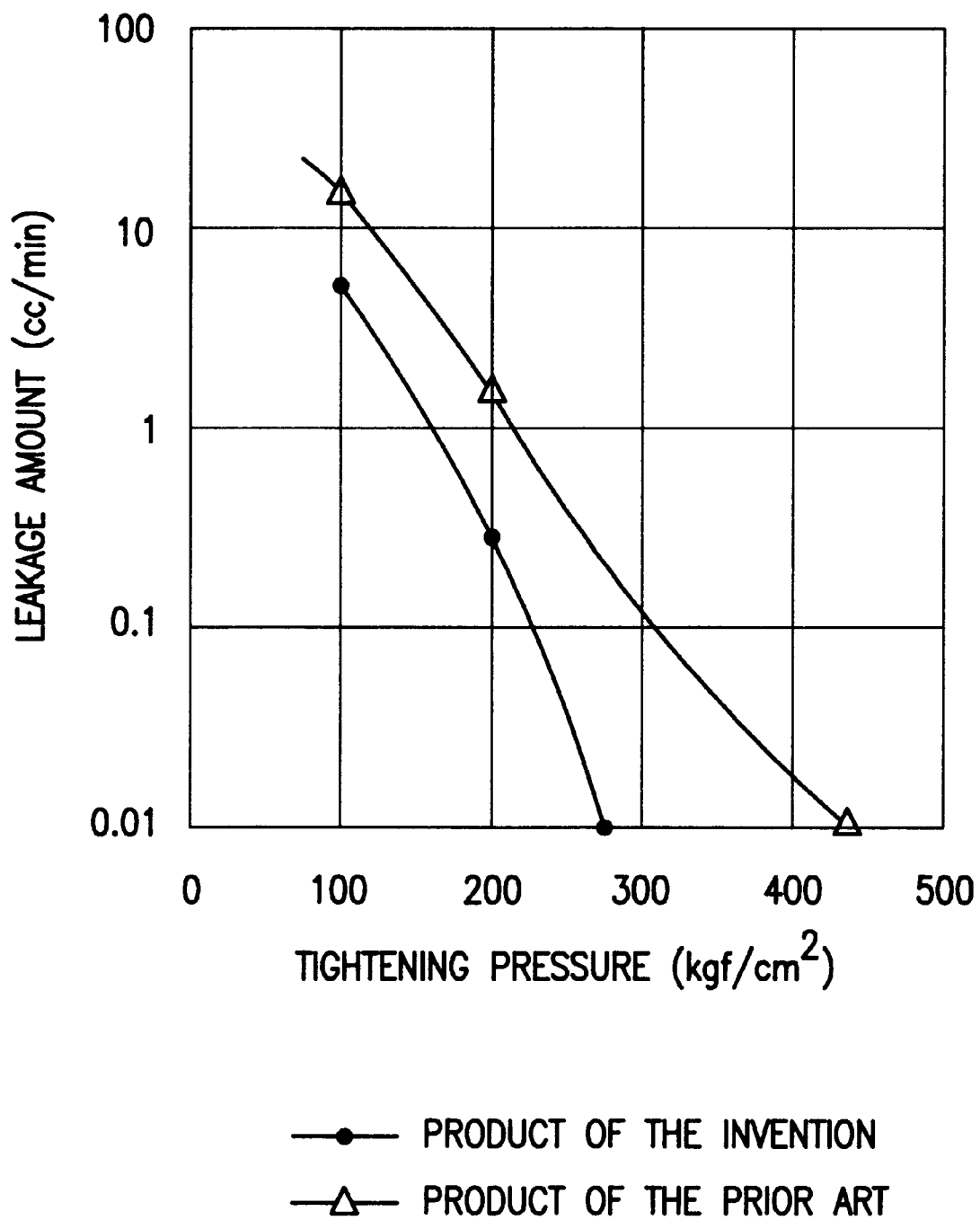
FIG. 6 is a graph showing the results of a gas seal test.

Test pieces corresponding to the present invention were packings (see FIG. 11) which were obtained by cutting the sheet-like sealing material made of expanded graphite used in the flexible test into tape-like pieces of a width of 15 mm, spirally winding the tape-like sealing material, and then die-molding the material into a ring-like piece of an inner diameter of 24 mm, an outer diameter 37 mm, and a height of 6.5 mm by using molds. Test pieces corresponding to prior art products were obtained by cutting the sheet-like sealing material made of expanded graphite used in the flexible test into tape-like pieces of a width of 15 mm, and forming the tape-like sealing material into ring-like pieces of specifications similar to the test pieces corresponding to the present invention. Relationships between a tightening pressure and a leakage amount in the case where the ring-like mold packings were placed under a helium gas pressure condition of 53 kgf/cm$^2$ were measured. FIG. 6 shows the results of the tests.

As apparent from the test results, in the products in which the surface layer portion is removed by less than 10%, preferably, 1 to 6% of the thickness of the expanded graphite base material 11 so that the diffraction peak of an X-ray diffraction of the exposed surfaces 11a, 11b is in a range of 26.53° to 26.45°, the flexibility is superior to the prior art products, the 90°-bendable number can be improved to be 300 times or more, the lower limit of the bendable radius of curvature can be reduced to be (⅓) or less, and the sealing property at a low tightening pressure is excellent.

Hereinafter, application examples of the sealing material made of expanded graphite of the invention will be sequentially described.

APPLICATION EXAMPLE 1

Figure 7:
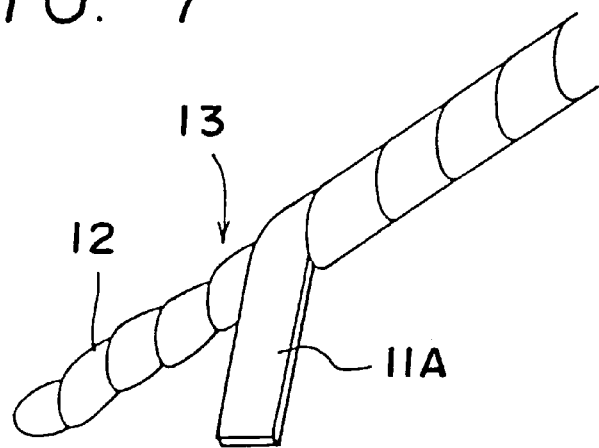
FIG. 7 is a perspective view showing application example 1 of the sealing material made of expanded graphite of the present invention.

In the example, as shown in FIG. 7, a tape-like expanded graphite base material 11A which is obtained by splitting a sheet-like sealing material made of expanded graphite wherein the front and back surface layer portions are removed away by a predetermined reduction rate as described above, into pieces of a small width is spirally wound on the outer peripheral portion of spun yarn 12 such as carbon filament, thereby forming a string-like sealing member 13.

APPLICATION EXAMPLE 2

Figure 8:
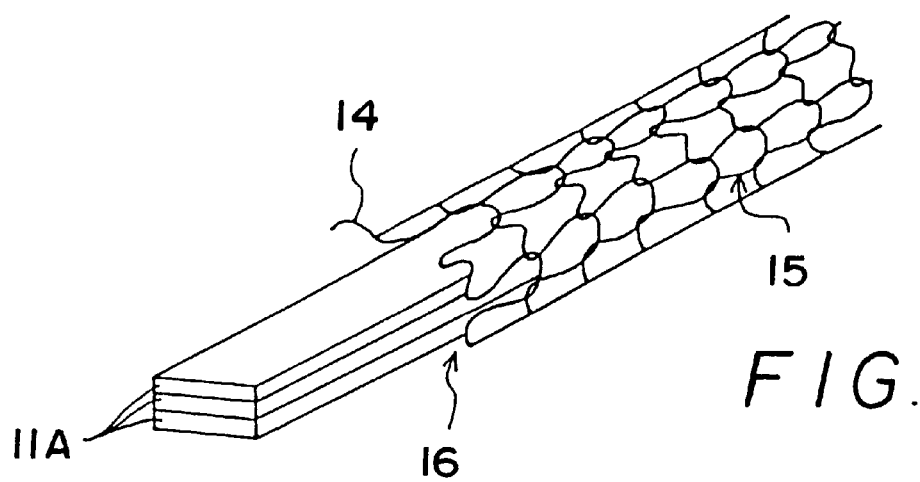
FIG. 8 is a perspective view showing application example 2 of the sealing material made of expanded graphite of the present invention.

In the example, as shown in FIG. 8, a tape-like expanded graphite base material 11A which is obtained by splitting a sheet-like sealing material made of expanded graphite wherein the front and back surface layer portions are removed by a predetermined reduction rate as described above, into pieces of a small width, or a plurality of the expanded graphite base materials are laminated. A knit reinforcing member 15 made of a metal wire 14 of SUS304 and having a small diameter or, for example, a diameter of 0.1 mm is covered on the outer periphery of the lamination, thereby forming an outer-reinforced yarn-like sealing member 16.

APPLICATION EXAMPLE 3

Figure 9:
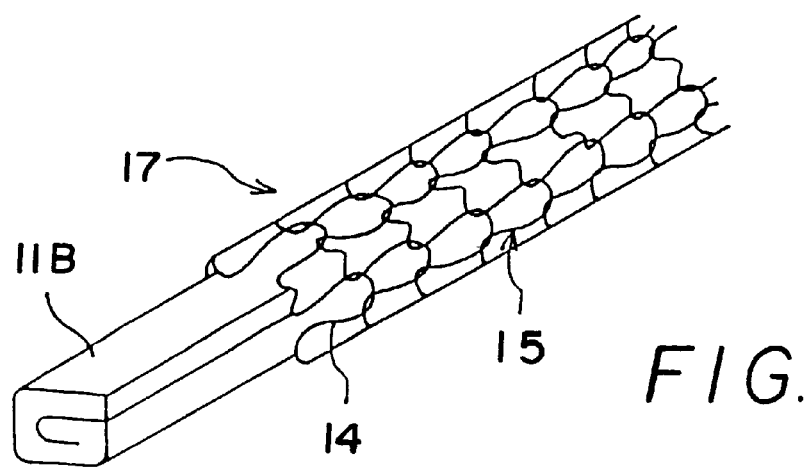
FIG. 9 is a perspective view showing application example 3 of the sealing material made of expanded graphite of the present invention.

In the example, as shown in FIG. 9, an expanded graphite base material 11B which is obtained by splitting a sheet-like sealing material made of expanded graphite wherein the front and back surface layer portions are removed by a predetermined reduction rate as described above, into pieces of a suitable width is folded in the width direction. A knit reinforcing member 15 made of a metal wire 14 of SUS304 and having a small diameter or, for example, a diameter of 0.1 mm is covered on the outer periphery of the folded member, thereby forming an outer-reinforced yarn-like sealing member 17.

APPLICATION EXAMPLE 4

Figure 10:
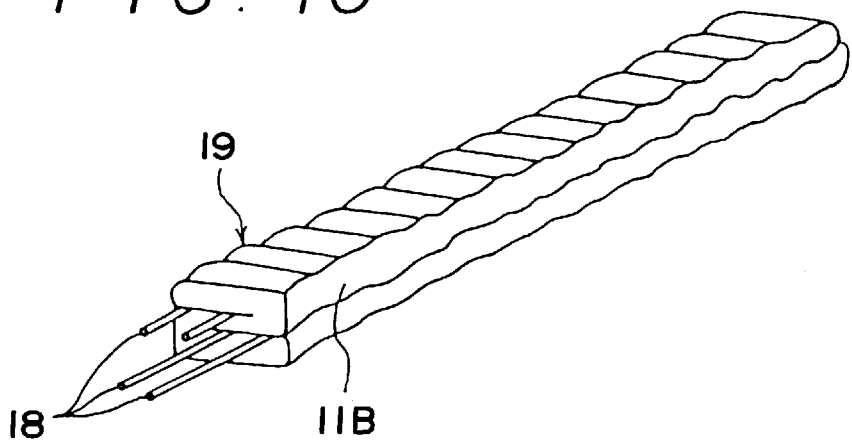
FIG. 10 is a perspective view showing application example 4 of the sealing material made of expanded graphite of the present invention.

In the example, as shown in FIG. 10, an expanded graphite base material 11B which is obtained by splitting a sheet-like sealing material made of expanded graphite wherein the front and back surface layer portions are removed by a predetermined reduction rate as described above, into pieces of a suitable width is folded in the width direction into a substantially Z-like shape. A corrugation process is conducted on the surface of the folded member in the longitudinal direction. Reinforcing wires 18 made of cotton or the like are passed through the folded member, thereby forming an inner-reinforced yarn-like sealing member 19.

APPLICATION EXAMPLE 5

Figure 11:
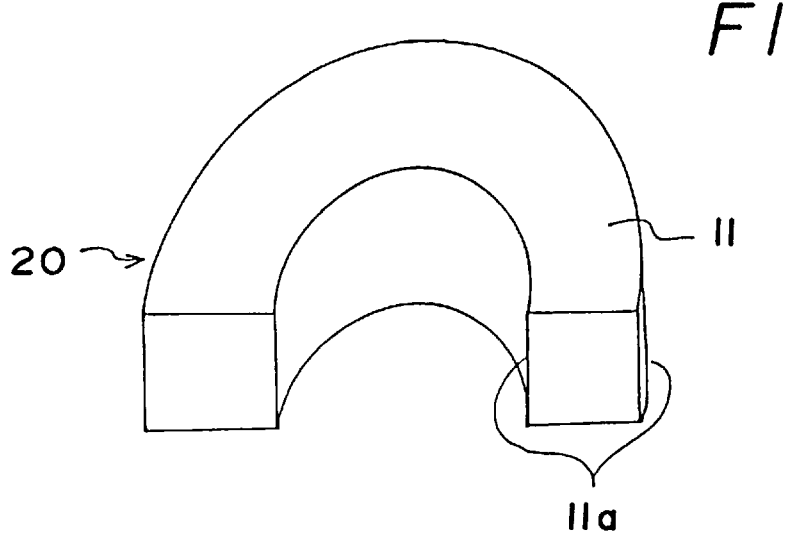
FIG. 11 is a partially cutaway perspective view showing application example 5 of the sealing material made of expanded graphite of the present invention.

In the example, as shown in FIG. 11, an expanded graphite base material 11 which is obtained by splitting a sheet-like sealing material made of expanded graphite wherein the front and back surface layer portions are removed by a predetermined reduction rate as described above, into pieces of a suitable width is die-molded into a ring-like shape so that the front and back surface layer portions 11a after the removal process by a blast process constitute the inner and outer peripheral faces, thereby forming a ring-like molded member 20. The member as it is may be used as a bearing or the like.

The sealing material may be applied, in addition to above-mentioned application examples 1 to 5, also to a configuration of the prior art in which a film, metal foil, and a string are bonded to at least one face of an expanded graphite sheet via an adhesive agent, and a composite configuration in which a film, metal foil, and a string are bonded between two expanded graphite sheets.

Industrial Applicability

As described above, in the sealing material made of expanded graphite of the present invention, the elongation characteristics and the tensile strength property which are originally provided to the inner layer portion are provided also to the surface layer portion, so that the elongation rate and the tensile strength of the sealing material can be enhanced.

In the sealing material in which the surface layer portion is set so that the diffraction peak of an X-ray diffraction of an exposed surface is in a range of 26.53° to 26.45°, the flexibility is extremely improved so that the allowable number of bending operations is remarkably increased. Moreover, the whole or most of the thin-leaf compressed members which are highly oriented in the surface layer portion and which have a small thickness are removed, and hence cracks or partial flaking in the surface layer portion are prevented from occurring in a working process involving a bending operation such as winding or folding. Even in a product of a small radius of curvature, the sealing property is not impaired. As a result, it is possible to easily produce a product having an excellent sealing property.

Therefore, the sealing material made of expanded graphite of the present invention can attain an effect that the application range of a product using the sealing material can be widened, and a further effect that the restriction on working means can be reduced and hence the productivity of a product can be improved by employing high-speed working means.

According to the present invention, it is possible to obtain a sealing material while reducing a material to be wasted to an amount as small as possible.

According to the present invention, when the form is made into a sheet-like shape, the sealing material can be cut into an arbitrary size and shape so as to be employed in a process of various kinds of sealing materials.

According to the present invention, when the form is made into a press-molded product, the production of a ring-like packing or bearing is facilitated.

According to the present invention, when the form is made into a string, a packing material which is excellent in sliding resistance and the like can be easily obtained, and the size adjustment in the case where it is actually mounted can be performed easily.

According to the present invention, since at least one of a micro blasting process, a laser process, and a sputtering process is used as means for removing the surface layer portion of an expanded graphite base material, the above-mentioned process of removing the surface layer portion can be efficiently performed and the removal amount can be arbitrarily adjusted. Therefore, quality can be improved.

According to the present invention, when a micro blasting process is used for removing the surface layer portion of the expanded graphite base material, soft walnut powder of a particle diameter of 50 to 100 $\mu$m may be used as particles for blasting. Even when a part of the particles remains on the surface after removal in the blasting process, therefore, there is no fear that the counter stem and the like are damaged by the remaining particles depending upon the use manner. Consequently, the cumbersome work of removing remaining particles after a blast process is not required, and the process of removing the surface layer portion can be conducted efficiently.

We claim:

1. A sealing material of expanded graphite, wherein the expanded graphite includes an expanded graphite base material in which expanded graphite particles are pressurized to be integrated with each other, said expanded graphite base material being subjected to a material removal process wherein a surface layer has been removed such that the weight of said expanded graphite base material is reduced within a range of 0.5% to 3%.

2. The sealing material as defined in claim 1, wherein the sealing material has the shape of a sheet.

3. The sealing material as defined in claim 1, wherein the sealing material is formed by press-molding.

4. The sealing material as defined in claim 1, wherein the sealing material has the shape of a string.

5. A sealing material of expanded graphite, wherein the expanded graphite includes an expanded graphite base material having a surface layer portion in which expanded graphite particles are pressurized to be integrated with each other, said expanded graphite base material being subjected to a removal process wherein a surface layer has been removed such that a diffraction peak of an X-ray diffraction of an exposed surface of said expanded graphite base material is in a range of 26.52° to 26.48°.

6. The sealing material as defined in claim 5, wherein the sealing material has the shape of a sheet.

7. The sealing material as defined in claim 5, wherein the sealing material is formed by press-molding.

8. The sealing material as defined in claim 5, wherein the sealing material has the shape of a string.

9. A sealing material of expanded graphite, wherein the expanded graphite includes an expanded graphite base material having a surface layer portion in which expanded graphite particles are pressurized to be integrated with each other, said expanded graphite base material being subjected to a removal process wherein a surface layer has been removed such that a diffraction peak of an X-ray diffraction of an exposed surface of said expanded graphite base material is in the range of 26.53° to 26.45°.

10. The sealing material as defined in claim 9, wherein said diffraction peak is set by removing material from said surface layer portion in the amount of 10% or less of the thickness of said expanded graphite base material.

11. The sealing material as defined in claim 9, wherein said diffraction peak is set by removing material from said surface layer in the range of 1% to 6% of the thickness of said expanded graphite base material.

12. The sealing material as defined in claim 9, wherein the sealing material has the shape of a sheet.

13. The sealing material as defined in claim 9, wherein the sealing material is formed by press-molding.

14. The sealing material as defined in claim 9, wherein the sealing material has the shape of a string.

15. The sealing material as defined in claim 10, wherein the sealing material has the shape of a sheet.

16. The sealing material as defined in claim 10, wherein the sealing material is formed by press-molding.

17. The sealing material as defined in claim 10, wherein the sealing material has the shape of a string.

18. The sealing material as defined in claim 11, wherein the sealing material has the shape of a sheet.

19. The sealing material as defined in claim 11, wherein the sealing material is formed by press-molding.

20. The sealing material as defined in claim 11, wherein the sealing material has the shape of a sting.

21. A method of producing a sealing material from expanded graphite, comprising the steps of:

pressurizing expanded graphite particles for integration with each other to form an expanded graphite base material, the expanded graphite base material defining a surface layer portion; and removing material from the whole surface of the surface layer portion by a removal process wherein a surface layer has been removed so that the weight of the expanded graphite base material is reduced in the range of 0.5% to 3%, and wherein said removal process is one of a micro blasting process, a laser process and a sputtering process.

22. The method as defined in claim 21, wherein the removal process is a micro blasting process, said method further comprising the step of:

using walnut powder having a particle diameter of 50 μm to 100 μm in the micro blasting process as particles for blasting.

23. A method of producing a sealing material from expanded graphite, comprising the steps of:

pressurizing expanded graphite particles for integration with each other to form an expanded graphite base material, the expanded graphite base material defining a surface layer portion; and removing material from the whole surface of the surface layer portion by a removal process wherein a surface layer has been removed so that a diffraction peak of an X-ray diffraction of an exposed surface is in the range of 26.53° to 26.45°, and wherein said removal process is one of a micro blasting process, a laser process and a sputtering process.

24. The method as defined in claim 23, wherein the removal process is a micro blasting process, said method further comprising the step of:

using walnut powder having a particle diameter of 50 μm to 100 μm in the micro blasting process as particles for blasting.

* * * * *